United States Patent
Zhao

(10) Patent No.: US 10,708,939 B2
(45) Date of Patent: Jul. 7, 2020

(54) METHOD AND DEVICE FOR UPLINK DATA OPERATIONS

(71) Applicant: China Academy of Telecommunications Technology, Beijing (CN)

(72) Inventor: Yali Zhao, Beijing (CN)

(*) Notice: Subject to any disclaimer, the term of this patent is extended or adjusted under 35 U.S.C. 154(b) by 0 days.

(21) Appl. No.: 16/335,671

(22) PCT Filed: Sep. 1, 2017

(86) PCT No.: PCT/CN2017/100241
§ 371 (c)(1),
(2) Date: Mar. 21, 2019

(87) PCT Pub. No.: WO2018/054211
PCT Pub. Date: Mar. 29, 2018

(65) Prior Publication Data
US 2020/0037344 A1 Jan. 30, 2020

(30) Foreign Application Priority Data

Sep. 23, 2016 (CN) .......................... 2016 1 0849572

(51) Int. Cl.
| | |
|---|---|
| *H04L 12/28* | (2006.01) |
| *H04W 72/12* | (2009.01) |
| *H04J 1/16* | (2006.01) |

(52) U.S. Cl.
CPC ... *H04W 72/1268* (2013.01); *H04W 72/1236* (2013.01); *H04W 72/1289* (2013.01)

(58) Field of Classification Search
CPC ......... H04W 72/1236; H04W 72/1268; H04W 72/1289; H04W 72/14; H04L 5/0058
(Continued)

(56) References Cited

U.S. PATENT DOCUMENTS

| | | | | |
|---|---|---|---|---|
| 2013/0058315 | A1* | 3/2013 | Feuersanger | H04W 52/281 370/336 |
| 2019/0116582 | A1* | 4/2019 | Pelletier | H04W 72/048 |
| 2019/0342895 | A1* | 11/2019 | Loehr | H04L 5/0044 |

FOREIGN PATENT DOCUMENTS

| | | |
|---|---|---|
| CN | 102143596 A | 8/2011 |
| CN | 105517182 A | 4/2016 |

(Continued)

OTHER PUBLICATIONS

3GPP TSG RAN WG1 Meeting #85, R1-164273, 'Frequency multiplexing of different numerologies', Nanjing, China, May 23-27, 2016.

(Continued)

*Primary Examiner* — John Pezzlo
(74) *Attorney, Agent, or Firm* — Kilpatrick Townsend & Stockton, LLP

(57) ABSTRACT

A method and a device for uplink data operations are provided to enable a user equipment to perform uplink data transmission for a numerology scenario. In embodiments of the present application, the user equipment determines uplink scheduling signaling according to a first correspondence between a numerology and the uplink scheduling signaling, determines a bearer according to a second correspondence between the numerology and the bearer, and performs an uplink data operation according to the uplink scheduling signaling and the bearer. In the present invention, since the user equipment can perform uplink data operations according to the first correspondence between the numerology and the uplink scheduling signaling and the second correspondence between the numerology and the bearer, the user equipment is able to perform uplink data operations for the numerology scenario, thus improving system performance.

18 Claims, 3 Drawing Sheets

(58) Field of Classification Search
USPC .................................... 370/252, 329, 386
See application file for complete search history.

(56) References Cited

FOREIGN PATENT DOCUMENTS

| | | |
|---|---|---|
| WO | 2014139562 A1 | 9/2014 |
| WO | 2015119359 A1 | 8/2015 |
| WO | 2016130175 A1 | 8/2016 |
| WO | 2016148828 A1 | 9/2016 |

OTHER PUBLICATIONS

"MAC Aspects for Supporting Multiple Services", 3GPP TSG-RAN WG2 Meeting #95, R2-165175, Goteborg, Sweden, Aug. 22-26, 2016, 4 pages.

\* cited by examiner

METHOD AND DEVICE FOR UPLINK DATA OPERATIONS

CROSS-REFERENCE TO RELATED APPLICATIONS

This application is a National Stage of International Application No. PCT/CN2017/100241, filed on Sep. 1, 2017, which claims priority to Chinese Patent Application No. 201610849572.6, filed with the Chinese Patent Office on Sep. 23, 2016, and entitled "Method and device for performing an uplink data operation", the content of which is hereby incorporated by reference in its entirety.

FIELD

The present invention relates to the field of wireless communications, and particularly to a method and device for performing an uplink data operation.

BACKGROUND

The numerology is such a special term in the 3$^{rd}$ Generation partnership Project (3GPP) Radio Access Networks (RAN) 1 relating to a number of aspects, e.g., a sub-carrier spacing, a Cyclic Prefix (CP) length, etc.

In a new network architecture introduced to a new generation of wireless network system (a 5G system), network-side nodes include a Central Unit (CU), and Transmission and Reception Points (TRPs) which are distributed units, and user-side nodes include user equipments. At the network side, a Central Unit (CU) controls a plurality of distributed TRPs deployed in some area, and transmits with a user equipment via an air interface through a TRP, that is, the network-side nodes include the CU and the TRPs in a two-layer network structure. One or more TRPs can serve a user equipment concurrently so that the user equipment transmits data. There may be transmission in a plurality of beam directions under one TRP.

For a future mobile communication system, a plurality of numerology designs are introduced to the 3GPP RAN 1, and the different numerologies can be applied in a time-division or frequency-division mode as defined. In the case that multiple numerologies are introduced, in a possible Medium Access Control (MAC) scheme, the network side schedules respectively for each numerology.

Since the different numerology designs are introduced to the 3GPP RAN 1, and there are different transmission Quality of Service (QoS) demands of different services, different numerologies for transmission are applied to the different services, but there has been absent so far a feasible solution to determining a resource for uplink data transmission in this case.

SUMMARY

The invention provides a method and device for performing an uplink data operation so as to enable a user equipment to transmit uplink data in the scenario where a number of numerologies are introduced.

An embodiment of the invention provides a method for performing an uplink data operation, the method including:

determining, by a user equipment, an uplink grant corresponding to a numerology configured by the network side for the user equipment, according to a first correspondence relationship between numerologies and uplink grants;

determining, by the user equipment, one or more bearers corresponding to the numerology configured by the network side for the user equipment, according to a second correspondence relationship between the numerologies and bearers; and performing, by the user equipment, an uplink data operation according to the determined uplink grant corresponding to the numerology, and the determined bearers corresponding to the numerology.

Optionally the bearer is a radio bearer or a logical channel.

Optionally the method further includes:

determining, by the user equipment, the first correspondence relationship and/or the second correspondence relationship according to a configuration of a network-side device.

Optionally the user equipment determines the first correspondence relationship configured by the network-side device in a part or all of the following implementations:

the user equipment determines the first correspondence relationship according to numerology identifiers carried in the uplink grants configured by the network-side device;

the user equipment determines the first correspondence relationship according to physical resources corresponding to the uplink grants configured by the network-side device, or physical resources corresponding to uplink data transmission resources corresponding to the uplink grants, and a third correspondence relationship between the numerologies and the physical resources of the uplink grants or uplink data transmission resources;

the user equipment determines the first correspondence relationship according to network slice identifiers corresponding to the uplink grants configured by the network-side device, or network slice identifiers corresponding to uplink data transmission resources corresponding to the uplink grants, and a fourth correspondence relationship between the numerologies and the network slice identifiers; and the user equipment determines the first correspondence relationship according to network slice identifiers carried in the uplink grants configured by the network-side device, and a fourth correspondence relationship between the numerologies and the network slice identifiers.

Optionally the user equipment determines the second correspondence relationship configured by the network-side device in a part or all of the following implementations:

the user equipment determines the second correspondence relationship between the bearers and the numerologies, configured by a network-side device, when the bearers are set up;

the user equipment determines the second correspondence relationship between the bearers and the numerologies, configured by the network-side device via uplink grant;

the user equipment determines the second correspondence relationship according to a fifth correspondence relationship between QoS parameters and the numerologies, carried in the uplink grant configured by the network-side device, and a sixth correspondence relationship between the bearers and QoS parameters, configured when the bearers of the user equipment are set up;

the user equipment determines the second correspondence relationship according to a fifth correspondence relationship between QoS parameters and the numerologies, notified by the network-side device via a broadcast or dedicated signaling, and a sixth correspondence relationship between the bearers and the QoS parameters, configured when the bearers of the user equipment are set up;

the user equipment determines the second correspondence relationship according to the network slice identifiers carried when the bearers are set up, and a fourth correspondence relationship between the numerologies and the network slice identifiers; and the user equipment determines the second correspondence relationship according to a seventh correspondence relationship between the QoS parameters and the network slice identifiers, notified by the network-side device via a broadcast or dedicated signaling, the QoS parameters of the bearers configured of the user equipment when the bearers are set up, and a fourth correspondence relationship between the numerologies and the network slice identifiers, notified by the network-side device via a broadcast or dedicated signaling.

Optionally performing, by the user equipment, an uplink data operation according to the determined uplink grant corresponding to the numerology, and bearers corresponding to the numerology includes:

allocating, by the user equipment, a resource, and composing an uplink data packet, according to the determined uplink grant corresponding to the numerology, and the bearers corresponding to the numerology.

Optionally allocating, by the user equipment, a resource according to the determined uplink grant corresponding to the numerology, and bearers corresponding to the numerology includes:

determining, by the user equipment, an allocation order according to priorities of the bearers corresponding to the numerology;

allocating, by the user equipment, a resource for each bearer from unallocated resources corresponding to the uplink grant according to a PBR of each bearer in the allocation order;

The user equipment determines whether an allocation condition is satisfied, after the resource is allocated for each bearer; and if the allocation condition is not satisfied, then allocating, by the user equipment, a resource for each bearer from the unallocated resources corresponding to the uplink grant according to the PBR of each bearer in the allocation order until the allocation condition is satisfied;

wherein the allocation condition is that resources are allocated for data of all the bearers, or the resources are exhausted.

Optionally before the user equipment performs an uplink data operation according to the determined uplink grant corresponding to the numerology, and bearers corresponding to the numerology, the method further includes:

determining, by the user equipment, an eighth correspondence relationship between the numerologies and physical layer parameters according to a prescription in a protocol, or a configuration of the network-side device via a broadcast or dedicated signaling; and performing, by the user equipment, an uplink data operation according to the determined uplink grant corresponding to the numerology, and the bearers corresponding to the numerology includes:

determining, by the user equipment, a physical layer parameter according to the eighth correspondence relationship; and performing, by the user equipment, an uplink data operation according to the determined physical layer parameter, the uplink grant corresponding to the numerology, and the bearers corresponding to the numerology.

An embodiment of the invention provides another method for allocating a resource, the method including:

determining, by a network-side device, first configuration information and second configuration information, wherein the first configuration information is used to determine a first correspondence relationship between numerologies and uplink grants, and the second configuration information is used to determine a second correspondence relationship between the numerologies and bearers; and transmitting, by the network-side device, the configuration information to a user equipment so that the user equipment determines an uplink grant according to the first correspondence relationship, determines one or more bearers according to the second correspondence relationship, and performs an uplink data operation according to the uplink grant and the bearers.

Optionally the first configuration information includes a part or all of the following information:

numerology identifiers;

physical resources corresponding to the uplink grants;

physical resources corresponding to uplink data transmission resources corresponding to the uplink grants;

network slice identifiers corresponding to the uplink grants; and network slice identifiers corresponding to uplink data transmission resources corresponding to the uplink grants.

Optionally the second configuration information includes a part or all of the following information:

the second correspondence relationship;

a fourth correspondence relationship between the numerologies and network slice identifiers;

a fifth correspondence relationship between QoS parameters and the numerologies;

a sixth correspondence relationship between bearers and QoS parameters;

a seventh correspondence relationship between QoS parameters and network slice identifiers; and network slice identifiers.

Optionally the method further includes:

configuring, by the network-side device, the user equipment with a parameter of a numerology via a broadcast or dedicated signaling so that the user equipment transmits data over an allocated resource according to the parameter of the numerology.

An embodiment of the invention provides a user equipment for performing an uplink data operation, the user equipment including:

a signaling determining module configured to determine an uplink grant corresponding to a numerology configured by the network side for the user equipment, according to a first correspondence relationship between numerologies and uplink grants;

an information determining module configured to determine one or more bearers corresponding to the numerology configured by the network side for the user equipment, according to a second correspondence relationship between the numerologies and bearers; and a processing module configured to perform an uplink data operation according to the determined uplink grant corresponding to the numerology, and the determined bearers corresponding to the numerology.

Optionally the bearer is a radio bearer or a logical channel.

Optionally the processing module is further configured:

to determine the first correspondence relationship and/or the second correspondence relationship according to a configuration of a network-side device.

Optionally the processing module is configured to determine the first correspondence relationship configured by the network-side device in a part or all of the following implementations:

the first correspondence relationship is determined according to numerology identifiers carried in the uplink grants configured by the network-side device;

the first correspondence relationship is determined according to physical resources corresponding to the uplink grants configured by the network-side device, or physical resources corresponding to uplink data transmission resources corresponding to the uplink grants, and a third correspondence relationship between the numerologies and the physical resources of uplink grants or uplink data transmission resources;

the first correspondence relationship is determined according to network slice identifiers corresponding to the uplink grants configured by the network-side device, or network slice identifiers corresponding to uplink data transmission resources corresponding to the uplink grants, and a fourth correspondence relationship between the numerologies and network slice identifiers; and the first correspondence relationship is determined according to network slice identifiers carried in the uplink grants configured by the network-side device, and a fourth correspondence relationship between the numerologies and network slice identifiers.

Optionally the processing module is configured to determine the second correspondence relationship configured by the network-side device in a part or all of the following implementations:

the second correspondence relationship between the bearers and the numerologies, configured by a network-side device is determined when the bearers are set up;

the second correspondence relationship between the bearers and the numerologies, configured by the network-side device via uplink grant is determined;

the second correspondence relationship is determined according to a fifth correspondence relationship between QoS parameters and the numerologies, carried in the uplink grant configured by the network-side device, and a sixth correspondence relationship between the bearers and the QoS parameters, configured when the bearers of the user equipment are set up;

the second correspondence relationship is determined according to a fifth correspondence relationship between QoS parameters and the numerologies, notified by the network-side device via a broadcast or dedicated signaling, and a sixth correspondence relationship between the bearers and QoS parameters, configured when the bearers of the user equipment are set up;

the second correspondence relationship is determined according to network slice identifiers carried when the bearers are set up, and a fourth correspondence relationship between the numerologies and network slice identifiers; and the second correspondence relationship is determined according to a seventh correspondence relationship between QoS parameters and network slice identifiers, notified by the network-side device via a broadcast or dedicated signaling, the QoS parameters of the bearers configured of the user equipment when the bearers are set up, and a fourth correspondence relationship between the numerologies and the network slice identifiers, notified by the network-side device via a broadcast or dedicated signaling.

Optionally the processing module is configured:

to allocate a resource, and to compose an uplink data packet, according to the determined uplink grant corresponding to the numerology, and the bearers corresponding to the numerology.

Optionally the processing module is configured:

to determine an allocation order according to priorities of the bearers corresponding to the numerology;

to allocate a resource for each bearer from unallocated resources corresponding to the uplink grant according to a PBR of each bearer in the allocation order;

to determine whether an allocation condition is satisfied, after the resource is allocated for each bearer; and if the allocation condition is not satisfied, to allocate a resource for each bearer from the unallocated resources corresponding to the uplink grant according to the PBR of each bearer in the allocation order until the allocation condition is satisfied;

wherein the allocation condition is that resources are allocated for data of all the bearers, or the resources are exhausted.

Optionally the processing module is configured:

to determine an eighth correspondence relationship between the numerologies and physical layer parameters according to a prescription in a protocol, or a configuration of the network-side device via a broadcast or dedicated signaling;

to determine a physical layer parameter according to the eighth correspondence relationship; and to perform an uplink data operation according to the determined physical layer parameter, the uplink grant corresponding to the numerology, and the bearers corresponding to the numerology.

An embodiment of the invention provides a network-side device for allocating a resource, the network-side device including:

a configuration determining module configured to determine first configuration information and second configuration information, where the first configuration information is used to determine a first correspondence relationship between numerologies and uplink grants, and the second configuration information is used to determine a second correspondence relationship between numerologies and bearers; and a transmitting module configured to transmit the configuration information to a user equipment so that the user equipment determines an uplink grant according to the first correspondence relationship, determines one or more bearers according to the second correspondence relationship, and performs an uplink data operation according to the uplink grant and the bearers.

Optionally the first configuration information includes a part or all of the following information:

numerology identifiers;

physical resources corresponding to the uplink grants;

physical resources corresponding to uplink data transmission resources corresponding to the uplink grants;

network slice identifiers corresponding to the uplink grants; and network slice identifiers corresponding to uplink data transmission resources corresponding to the uplink grants.

Optionally the second configuration information includes a part or all of the following information:

the second correspondence relationship;

a fourth correspondence relationship between the numerologies and network slice identifiers;

a fifth correspondence relationship between QoS parameters and the numerologies;

a sixth correspondence relationship between the bearers and QoS parameters;

a seventh correspondence relationship between the QoS parameters and the network slice identifiers; and network slice identifiers.

Optionally the transmitting module is further configured:

to configure the user equipment with a parameter of a numerology via a broadcast or dedicated signaling so that the user equipment transmits data over an allocated resource according to the parameter of the numerology.

An embodiment of the invention provides a second user equipment including:

a processor configured to read and execute program in a memory:

to determine uplink grant corresponding to a numerology configured by the network side for the user equipment, according to a first correspondence relationship between numerologies and uplink grants; to determine one or more bearers corresponding to the numerology configured by the network side for the user equipment, according to a second correspondence relationship between the numerologies and bearers; and to perform an uplink data operation according to the determined uplink grant corresponding to the numerology, and the determined bearers corresponding to the numerology; and a transceiver configured to receive and transmit data under the control of the processor.

An embodiment of the invention provides a second network-side device including:

a processor configured to read and execute program in a memory:

to determine first configuration information and second configuration information, where the first configuration information is used to determine a first correspondence relationship between numerologies and uplink grants, and the second configuration information is used to determine a second correspondence relationship between the numerologies and bearers; and to transmit the configuration information to a user equipment through a transceiver so that the user equipment determines uplink grant according to the first correspondence relationship, determines one or more bearers according to the second correspondence relationship, and performs an uplink data operation according to the uplink grant and the bearers; and the transceiver configured to receive and transmit data under the control of the processor.

In the embodiments of the invention, the user equipment determines the uplink grant according to the first correspondence relationship between the numerologies and uplink grants, determines one or more bearers according to the second correspondence relationship between the numerologies and bearers, and performs an uplink data operation according to the uplink grant and the bearer. Since the user equipment in the embodiment of the invention can perform an uplink data operation according to the first correspondence relationship between the numerologies and uplink grants, and the second correspondence relationship between the numerologies and bearers, the user equipment can perform an uplink data operation in the scenario with a number of numerologies, thus further improving the performance of the system.

BRIEF DESCRIPTION OF THE DRAWINGS

In order to make the technical solutions according to the embodiments of the invention more apparent, the drawings to which reference is to be made in the description of the embodiments will be introduced below in brief, and apparently the drawings in the following description are only some embodiments of the invention, and those ordinarily skilled in the art can further derive from these drawings other drawings without any inventive effort.

DETAILED DESCRIPTION OF THE INVENTION

In order to make the objects, technical solutions, and advantages of the invention more apparent, the invention will be described below in further details with reference to the drawings, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

Figure 1:
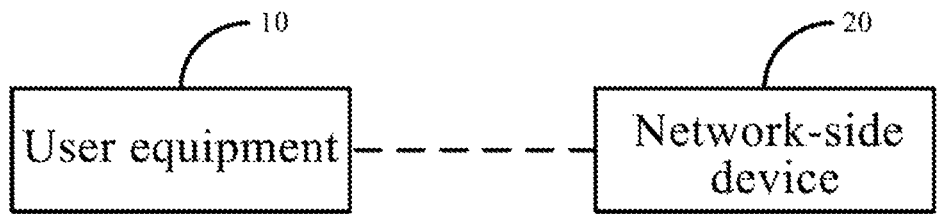
FIG. 1 is a schematic structural diagram of a system for performing an uplink data operation according to an embodiment of the invention.

As illustrated in FIG. 1, a system for performing an uplink data operation according to an embodiment of the invention includes: a user equipment 10 and a network-side device 20.

The user equipment 10 is configured to determine an uplink grant corresponding to a numerology configured by the network side for the user equipment, according to a first correspondence relationship between numerologies and uplink grants; to determine a bearer(s) corresponding to the numerology configured by the network side for the user equipment, according to a second correspondence relationship between numerologies and bearers; and to perform an uplink data operation according to the determined uplink grant corresponding to the numerology, and the bearer(s) corresponding to the numerology.

In the embodiment of the invention, the user equipment determines the uplink grant according to the first correspondence relationship between the numerologies and the uplink grants, determines the bearer(s) according to the second correspondence relationship between the numerologies and bearers, and performs an uplink data operation according to the uplink grant and the bearer(s). Since the user equipment in the embodiment of the invention can perform an uplink data operation according to the first correspondence relationship between numerologies and uplink grants, and the second correspondence relationship between the numerologies and the bearers, the user equipment can perform an uplink data operation in the scenario with the numerology, thus further improving the performance of the system.

Here the bearer in the embodiment of the invention can be a radio bearer and/or a logical channel.

In an implementation, the network-side device 20 is configured to determine first configuration information and second configuration information, where first configuration information is used to determine the first correspondence relationship between the numerologies and uplink grants, and the second configuration information is used to determine the second correspondence relationship between the numerologies and bearers; and to transmit the configuration information to the user equipment.

Correspondingly the user equipment is configured to determine the first correspondence relationship and/or the second correspondence relationship according to the configuration information of the network-side device.

Configuration schemes of the first correspondence relationship and the second correspondence relationship will be described below respectively.

I. The first correspondence relationship is configured.

In a first implementation, the first configuration information includes the first correspondence relationship.

Specifically the network-side device carries a numerology identifier(s) in an uplink grant(s), and transmits the uplink grant(s) to the user equipment.

Correspondingly the user equipment determines the first correspondence relationship according to the numerology identifier carried in the uplink grant configured by the network-side device.

In this implementation, the network-side device carries the numerology identifier(s) directly in the uplink grant(s).

The user equipment creates a correspondence relationship between the numerology(s) corresponding to the numerology identifier(s), and the uplink grant(s) carrying the identifier(s).

The identifier is notified via the uplink grant as described above only by way of an example, but any implementation in which the user equipment can be notified of the first correspondence relationship will be applicable to the embodiment of the invention.

In a second implementation, the first configuration information includes the physical resource(s) corresponding to the uplink grant(s), or the physical resource(s) corresponding to the uplink data transmission resource(s) corresponding to the uplink grant(s).

Specifically the network-side device configures the user equipment with the physical resource(s) corresponding to the uplink grant(s), or the physical resource(s) corresponding to the uplink data transmission resource(s) corresponding to the uplink grant(s).

Correspondingly the user equipment determines the first correspondence relationship according to the physical resources corresponding to the uplink grants, or the physical resources corresponding to the uplink data transmission resources corresponding to the uplink grants, configured by the network-side device, and a third correspondence relationship between the numerologies and the physical resources of uplink grant or uplink data transmission resource.

For example, the network-side device configures the user equipment with the physical resource corresponding to the uplink grant.

The user equipment can determine the corresponding numerology according to the third correspondence relationship between the numerology and the physical resource corresponding to uplink grant, and thereafter create a correspondence relationship between the numerology corresponding to the physical resource, and the uplink grant.

For example, the network-side device configures the user equipment with the uplink data transmission resource corresponding to the uplink grant.

The user equipment can determine the corresponding numerology according to the third correspondence relationship between the numerology and the physical resource corresponding to the uplink data transmission resource corresponding to uplink grant, and thereafter create a correspondence relationship between the numerology corresponding to the physical resource, and the uplink grant.

In a third implementation, the first configuration information includes network slice identifier(s) corresponding to the uplink grant(s), or a network slice identifier(s) corresponding to an uplink data transmission resource(s) corresponding to the uplink grant(s).

Specifically the network-side device configures the UE with the network slice identifier(s) corresponding to the uplink grant(s) (that is, binds the network slice identifier with the uplink grant), or the network-side device configures the UE with the network slice identifier(s) corresponding to the uplink data transmission resource(s) corresponding to the uplink grant(s) (that is, binds the network slice identifier with the uplink data transmission resource).

Correspondingly the user equipment determines the first correspondence relationship according to the network slice identifier(s) corresponding to the uplink grant(s), or the network slice identifier(s) corresponding to the uplink data transmission resource(s) corresponding to the uplink grant(s), configured by the network-side device, and a fourth correspondence relationship between the numerologies and the network slice identifiers.

For example, the network-side device configures the user equipment with the network slice identifiers corresponding to the uplink grants.

The user equipment can determine the corresponding numerology according to the fourth correspondence relationship between the numerologies and network slice identifiers, and thereafter create a correspondence relationship between the numerology corresponding to the network slice identifier, and the uplink grant.

For example, the network-side device configures the user equipment with the network slice identifier corresponding to the uplink data transmission resource corresponding to the uplink grant.

The user equipment can determine the corresponding numerology according to the fourth correspondence relationship between the numerologies and the network slice identifiers, and thereafter create a correspondence relationship between the numerologies corresponding to the network slice identifiers, and the uplink grants.

In a fourth implementation, the first configuration information includes network slice identifiers.

Specifically the network-side device carries the network slice identifier(s) in the uplink grant(s).

Correspondingly the user equipment determines the first correspondence relationship according to the network slice identifiers carried in the uplink grants configured by the network-side device, and a fourth correspondence relationship between the numerologies and network slice identifiers.

Here the user equipment can determine the numerology(s) corresponding to the network slice identifier(s) according to the fourth correspondence relationship upon reception of the uplink grant(s) including the network slice identifier(s), and thereafter create a correspondence relationship between the uplink grant(s) including the network slice identifier(s), and the determined numerology(s).

It shall be noted that the several implementations above have been described only by way of an example, but any implementation in which the user equipment can be configured with the first correspondence relationship will be applicable to the embodiment of the invention, and for example, the network-side device can configure the user equipment directly with the first correspondence relationship.

II. The second correspondence relationship is configured.

In a first implementation, the second configuration information includes the second correspondence relationship between the numerologies and bearers.

Specifically the network-side device can configure the user equipment with the second correspondence relationship between the numerology (or numerologies) and the bearer(s) when the bearer(s) of the user equipment is(are) set up.

Correspondingly the user equipment determines the second correspondence relationship between the numerology (or numerologies) and the bearer(s) configured by the network-side device, when the bearer(s) is(are) set up.

Here the network-side device can configure the user equipment directly with the second correspondence relationship.

It shall be noted that the user equipment is configured with the second correspondence relationship when the bearer(s) is(are) set up, as described above only by way of an example, but the user equipment can be configured with the second correspondence relationship at any time before the user equipment uses the second correspondence relationship.

In a second implementation, the second configuration information includes the second correspondence relationship between the numerology(numerologies) and the bearer(s).

Specifically the network-side device carries the second correspondence relationship between the numerology and the bearers in the uplink grant, and transmits the uplink grant to the user equipment.

Correspondingly the user equipment determines the second correspondence relationship between the numerology and the bearer configured by the network-side device via the uplink grant.

Here the network-side device can configure the user equipment directly with the second correspondence relationship.

It shall be noted that the user equipment is configured with the second correspondence relationship via the uplink grant as described above only by way of an example, but any information for configuring the user equipment with the second correspondence relationship will be applicable to the embodiment of the invention.

In a third implementation, the second configuration information includes a fourth correspondence relationship between the numerologies and the network slice identifiers, and a fifth correspondence relationship between QoS parameters and numerologies.

Specifically the network-side device carries the fifth correspondence relationship between a QoS parameter and a numerology in the uplink grant, and transmits the uplink grant to the user equipment; and configures the user equipment with a sixth correspondence relationship between the bearer(s) and the QoS parameter(s) when the bearer(s) of the user equipment is(are) set up.

Correspondingly the user equipment determines the second correspondence relationship according to the fifth correspondence relationship between the QoS parameter(s) and the numerology(numerloges), carried in the uplink grant(s) configured by the network-side device, and the sixth correspondence relationship the bearer(s) and the QoS parameter(s), configured when the bearer(s) of the user equipment is(are) set up.

The user equipment can create a correspondence relationship between the numerology and the bearer, both of which correspond to the same QoS parameter according to the fifth correspondence relationship between the QoS parameter and the numerology, carried in the uplink grant configured by the network-side device, and the sixth correspondence relationship the bearer and the QoS parameter, configured when the bearer of the user equipment is set up.

It shall be noted that the user equipment is configured with the fifth correspondence relationship via the uplink grant as described above only by way of an example, but any information for configuring the user equipment with the fifth correspondence relationship will be applicable to the embodiment of the invention; and the user equipment is configured with the sixth correspondence relationship when the bearer is set up, as described above only by way of an example, but the user equipment can be configured with the sixth correspondence relationship at any time before the user equipment uses the second correspondence relationship.

In a fourth implementation, the second configuration information includes a fourth correspondence relationship between the numerology(numerologies) and the network slice identifier(s), and a fifth correspondence relationship between the QoS parameter(s) and the numerology(numerologies).

Specifically the network-side device configures the user equipment with the fifth correspondence relationship between the QoS parameter(s) and the numerology(numerologies) via a broadcast or dedicated signaling; and configures the user equipment with a sixth correspondence relationship between the bearer(s) and the QoS parameter(s) when the bearer(s) of the user equipment is(are) set up.

Correspondingly the user equipment determines the second correspondence relationship according to the fifth correspondence relationship between the QoS parameter(s) and the numerology(numerologies), notified by the network-side device via the broadcast or the dedicated signaling, and the sixth correspondence relationship the bearer(s) and the QoS parameter(s), configured when the bearer(s) of the user equipment is(are) set up.

The user equipment can create a correspondence relationship between the numerology and the bearer, both of which correspond to the same QoS parameter according to the fifth correspondence relationship between the QoS parameter and the numerology, carried in the uplink grant configured by the network-side device, and the sixth correspondence relationship the bearer and the QoS parameter, configured when the bearer of the user equipment is set up.

It shall be noted that the user equipment is configured with the fifth correspondence relationship via the broadcast or the dedicated signaling as described above only by way of an example, but any information for configuring the user equipment with the fifth correspondence relationship will be applicable to the embodiment of the invention; and the user equipment is configured with the sixth correspondence relationship when the bearer is set up, as described above only by way of an example, but the user equipment can be configured with the sixth correspondence relationship at any time before the user equipment uses the second correspondence relationship.

In a fifth implementation, the second configuration information includes a network slice identifier(s).

Specifically the network-side device can configure the user equipment with the network slice identifier when a bearer of the user equipment is set up.

Correspondingly the user equipment determines the second correspondence relationship according to the network slice identifier(s) carried when the bearer(s) is(are) set up, and a fourth correspondence relationship between the numerology(numerologies) and a network slice identifier(s).

The user equipment can determine the numerology corresponding to the configured network slice identifier according to the fourth correspondence relationship between the numerology(numerologies) and the network slice identifier(s), and create a correspondence relationship between the determined numerology, and the bearer which is set up.

It shall be noted that the user equipment is configured with the second correspondence relationship when the bearer is set up, as described above only by way of an example, but the user equipment can be configured with the second correspondence relationship at any time before the user equipment uses the second correspondence relationship.

In a sixth implementation, the second configuration information includes a seventh correspondence relationship between the QoS parameter(s) and the network slice identifier(s), and a fourth correspondence relationship between the numerology(numerologies) and the network slice identifier(s).

Specifically the network-side device configures the user equipment with the seventh correspondence relationship between the QoS parameter(s) and the network slice identifier(s) via a broadcast or dedicated signaling, configures the user equipment with the fourth correspondence relationship between the numerology(numerologies) and the network slice identifiers via a broadcast or dedicated signaling, and configures the user equipment with the QoS parameter(s) of the bearer(s) of the user equipment when the bearer(s) is(are) set up.

Correspondingly the user equipment determines the second correspondence relationship according to the seventh correspondence relationship between the QoS parameter(s) and the network slice identifier(s), notified by the network-side device via the broadcast or the dedicated signaling, the QoS parameter(s) of the bearer(s) configured when the bearer(s) of the user equipment is(are) set up, and the fourth correspondence relationship between the numerology(numerologies) and the network slice identifier(s), configured by the network-side device via the broadcast or the dedicated signaling.

Here the user equipment can determine the network slice identifier corresponding to the QoS parameter configured when the bearer is set up, according to the seventh correspondence relationship between the QoS parameter and the network slice identifier; thereafter can determine the numerology corresponding to the previously determined network slice identifier according to the fourth correspondence relationship between the numerology and the network slice identifier; and lastly can create a correspondence relationship between the determined numerology, and the bearer which is set up.

It shall be noted that the user equipment is configured with the fourth correspondence relationship and the seventh correspondence relationship via the broadcast or the dedicated signaling as described above only by way of an example, but any information for configuring the user equipment with the fourth correspondence relationship and the seventh correspondence relationship will be applicable to the embodiment of the invention; and the user equipment is configured with the QoS parameter when the bearer is set up, as described above only by way of an example, but the user equipment can be configured with the QoS parameter at any time before the user equipment uses the second correspondence relationship.

The uplink grant as mentioned above can be any grant, e.g., a Physical Downlink Control Channel (PDCCH), etc.

Optionally the user equipment performs an uplink data operation, which includes allocating a resource and composing an uplink data packet.

Here when the user equipment allocates a resource according to the determined uplink grant corresponding to the numerology and bearers corresponding to the numerology, the user equipment determines allocation orders according to the priorities of the bearers, and allocates the resource according the allocation orders.

Specifically the user equipment determines the allocation order according to the priorities of the bearers corresponding to the numerology.

The user equipment allocates a resource for each bearer from unallocated resources corresponding to the uplink grant according to a Prioritized Bit Rate (PBR) of each bearer in the allocation order.

The user equipment determines whether an allocation condition is satisfied, after the resource is allocated for each bearer.

If the allocation condition is not satisfied, then the user equipment allocates a resource for each bearer from the unallocated resources corresponding to the uplink grant according to the PBR of each bearer in the allocation order until the allocation condition is satisfied.

Where the allocation condition is that resources are allocated for data of all the bearers, or the resources are exhausted.

For example, there are three bearers, which are a bearer A, a bearer B, and a bearer C, and the allocation order is determined as the bearer C, the bearer A, and the bearer B according to the priorities of the bearers corresponding to the numerology.

Firstly a resource is allocated for the bearer C from the unallocated resources according to the PBR of the carrier C, then a resource is allocated for the bearer A from the unallocated resources according to the PBR of the carrier A, and finally a resource is allocated for the bearer B from the unallocated resources according to the PBR of the carrier B.

If a resource is not allocated for data of some bearer, or there is an unallocated resource among resources which can be allocated, then resources will be further allocated for the respective carriers in the order of the bearer C, the bearer A, and the bearer B until resources are allocated for data of all the bearers, or the resources are exhausted (all the resources which can be allocated have been allocated).

Optionally the user equipment can determine an eighth correspondence relationship between the numerologies and physical layer parameters according to a prescription in a protocol, or a configuration of the network-side device via a broadcast or dedicated signaling.

When the user equipment performs an uplink data operation according to the determined uplink grant corresponding to the numerology, and one or more bearers corresponding to the numerology, the user equipment determines a physical layer parameter according to the eighth correspondence relationship.

The user equipment performs an uplink data operation according to the determined physical layer parameter, the uplink grant corresponding to the numerology, and the bearer(s) corresponding to the numerology.

Here the physical layer parameter includes but will not be limited to a part or all of the following parameters: a sub-carrier spacing: a Cyclic Prefix (CP) length; or a Transmission Time Interval (TTI) length.

Figure 2:
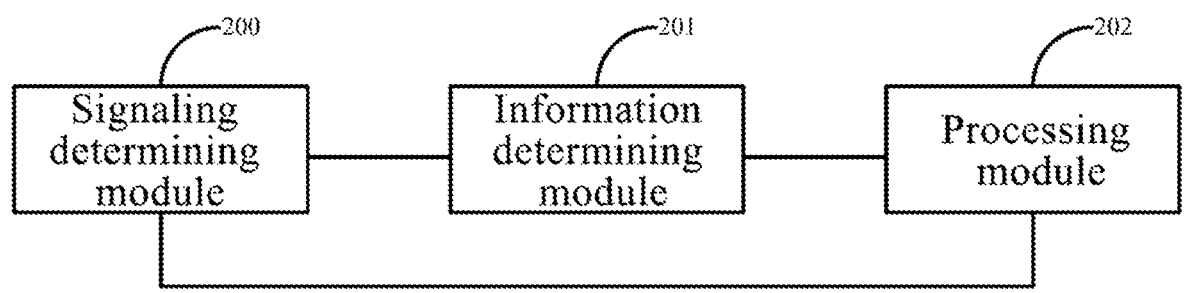
FIG. 2 is a schematic structural diagram of a first user equipment according to an embodiment of the invention.

As illustrated in FIG. 2, a first user equipment according to an embodiment of the invention includes the followings.

A signaling determining module 200 is configured to determine an uplink grant corresponding to a numerology configured by the network side for the user equipment, according to a first correspondence relationship between the numerologies and uplink grants.

An information determining module 201 is configured to determine one or more bearers corresponding to the numerology configured by the network side for the user equipment, according to a second correspondence relationship between the numerologies and the bearers.

A processing module 202 is configured to perform an uplink data operation according to the determined uplink grant corresponding to the numerology, and the one or more bearers corresponding to the numerology.

Optionally the bearer is a radio bearer or a logical channel.

Optionally the processing module 202 is further configured: to determine the first correspondence relationship and/or the second correspondence relationship according to a configuration of a network-side device.

Optionally the processing module 202 is configured to determine the first correspondence relationship configured by the network-side device in a part or all of the following implementations.

The first correspondence relationship is determined according to the numerology identifier(s) carried in the uplink grant(s) configured by the network-side device.

The first correspondence relationship is determined according to the physical resource(s) corresponding to the uplink grant(s) configured by the network-side device, or the physical resource(s) corresponding to the uplink data transmission resource(s) corresponding to the uplink grant(s), and a third correspondence relationship between the numerology(numerologies) and the physical resource(s) of uplink grant(s) or uplink data transmission resource(s).

The first correspondence relationship is determined according to the network slice identifier(s) corresponding to the uplink grant(s) configured by the network-side device, or the network slice identifier(s) corresponding to the uplink data transmission resource(s) corresponding to the uplink grant(s), and a fourth correspondence relationship between the numerologies and network slice identifier(s).

The first correspondence relationship is determined according to the network slice identifier(s) carried in the uplink grant(s) configured by the network-side device, and a fourth correspondence relationship between the numerology(numerologies) and the network slice identifier(s).

Optionally the processing module 202 is configured to determine the second correspondence relationship configured by the network-side device in a part or all of the following implementations.

The second correspondence relationship between the bearer(s) and the numerology(numerologies), configured by a network-side device is determined when the bearer(s) is(are) set up.

The second correspondence relationship between the bearer(s) and the numerology(numerologies), configured by the network-side device via uplink grant is determined.

The second correspondence relationship is determined according to a fifth correspondence relationship between the QoS parameters and the numerology(numerologies), carried in the uplink grant configured by the network-side device, and a sixth correspondence relationship between the bearer(s) and the QoS parameter(s), configured when the bearer(s) of the user equipment is(are) set up.

The second correspondence relationship is determined according to a fifth correspondence relationship between the QoS parameter(s) and the numerology(numerologies), notified by the network-side device via a broadcast or dedicated signaling, and a sixth correspondence relationship between the bearer(s) and the QoS parameter(s), configured when the bearer(s) of the user equipment is(are) set up.

The second correspondence relationship is determined according to the network slice identifier(s) carried when the bearer(s) is(are) set up, and a fourth correspondence relationship between the numerology(numerologies) and the network slice identifiers.

The second correspondence relationship is determined according to a seventh correspondence relationship between the QoS parameter(s) and the network slice identifier(s), notified by the network-side device via a broadcast or dedicated signaling, the QoS parameter(s) of the bearer(s) configured of the user equipment when the bearer(s) is(are) set up, and a fourth correspondence relationship between the numerology(numerologies) and the network slice identifier(s), notified by the network-side device via a broadcast or dedicated signaling.

Optionally the processing module 202 is configured: to allocate a resource, and to compose an uplink data packet, according to the determined uplink grant corresponding to the numerology, and the bearers corresponding to the numerology.

Optionally the processing module 202 is configured: to determine an allocation order according to the priorities of the bearers corresponding to the numerology; to allocate a resource for each bearer from unallocated resources corresponding to the uplink grant according to a PBR of each bearer in the allocation order; to determine whether an allocation condition is satisfied, after the resource is allocated for each bearer; and if not, to allocate a resource for each bearer from the unallocated resources corresponding to the uplink grant according to the PBR of each bearer in the allocation order until the allocation condition is satisfied.

Where the allocation condition is that resources are allocated for data of all the bearers, or the resources are exhausted.

Optionally the processing module 202 is configured: to determine an eighth correspondence relationship between the numerology(numerologies) and the physical layer parameter(s) according to a prescription in a protocol, or a configuration of the network-side device via a broadcast or dedicated signaling; to determine a physical layer parameter according to the eighth correspondence relationship; and to perform an uplink data operation according to the determined physical layer parameter, the uplink grant corresponding to the numerology, and the bearers corresponding to the numerology.

Figure 3:
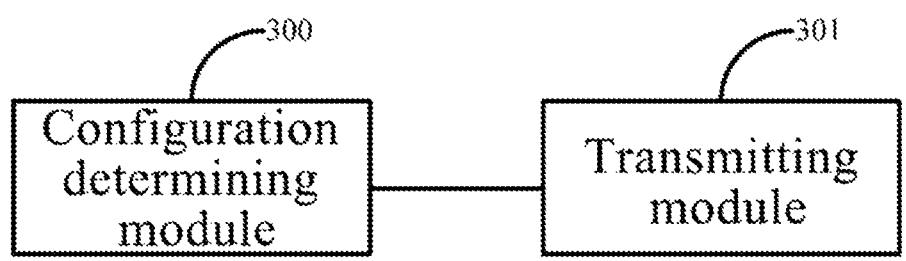
FIG. 3 is a schematic structural diagram of a first network-side device according to an embodiment of the invention.

As illustrated in FIG. 3, a first network-side device according to an embodiment of the invention includes the followings.

A configuration determining module 300 is configured to determine first configuration information and second configuration information, where the first configuration information is used to determine a first correspondence relationship between the numerologies and uplink grants, and the second configuration information is used to determine a second correspondence relationship between the numerologies and the bearers.

A transmitting module 301 is configured to transmit the configuration information to a user equipment so that the user equipment determines uplink grant according to the first correspondence relationship, determines one or more bearers according to the second correspondence relationship, and performs an uplink data operation according to the uplink grant and the one or more bearers.

Optionally the first configuration information includes a part or all of the following information: numerology identifier(s); physical resource(s) corresponding to the uplink grant(s); physical resource(s) corresponding to uplink data transmission resource(s) corresponding to the uplink grant(s); network slice identifier(s) corresponding to the uplink grant(s); and network slice identifier(s) corresponding to uplink data transmission resource(s) corresponding to the uplink grant(s).

Optionally the second configuration information includes a part or all of the following information: the second correspondence relationship; a fourth correspondence relationship between the numerology(numerologies) and the network slice identifier(s); a fifth correspondence relationship between the QoS parameter(s) and the numerology (numerologies); a sixth correspondence relationship between the bearer(s) and the QoS parameter(s); a seventh correspondence relationship between the QoS parameter(s) and the network slice identifier(s); and the network slice identifier(s).

Optionally the transmitting module 301 is further configured: to configure the user equipment with a parameter of a numerology via a broadcast or dedicated signaling so that the user equipment transmits data over an allocated resource according to the parameter of the numerology.

Figure 4:
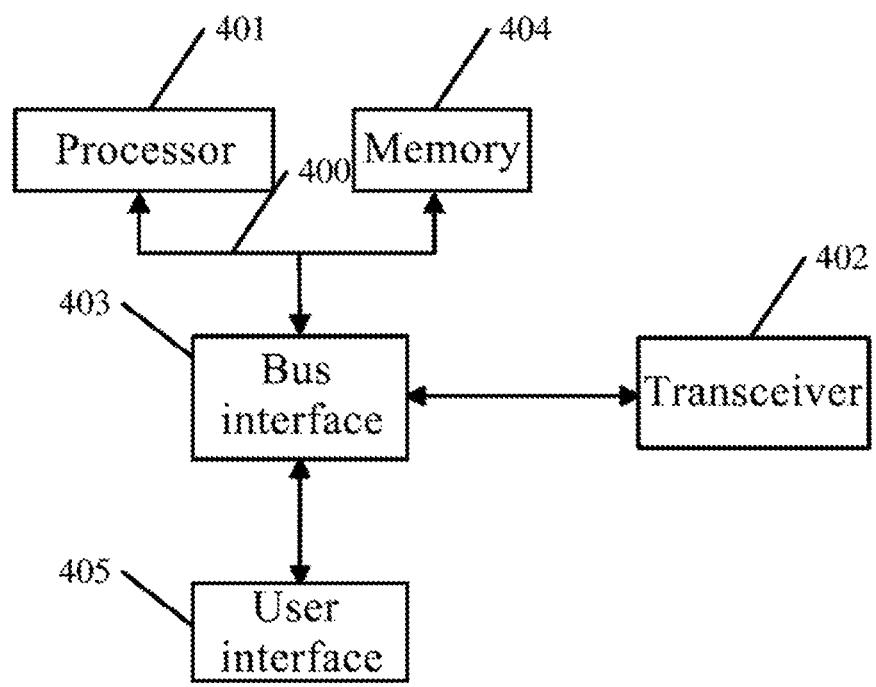
FIG. 4 is a schematic structural diagram of a second user equipment according to an embodiment of the invention.

As illustrated in FIG. 4, a second user equipment according to an embodiment of the invention includes the followings.

A processor 401 is configured to read and execute program in a memory 404: to determine uplink grant corresponding to a numerology configured by the network side for the user equipment, according to a first correspondence relationship between numerologies and uplink grants; to determine one or more bearers corresponding to the numerology configured by the network side for the user equipment, according to a second correspondence relationship between the numerologies and bearers; and to perform an uplink data operation according to the determined uplink grant corresponding to the numerology, and the one or more bearers corresponding to the numerology.

A transceiver 402 is configured to receive and transmit data under the control of the processor 401.

Optionally the bearer is a radio bearer or a logical channel.

Optionally the processor 401 is further configured: to determine the first correspondence relationship and/or the second correspondence relationship according to a configuration of a network-side device.

Optionally the processing module 202 is configured to determine the first correspondence relationship configured by the network-side device in a part or all of the following implementations.

The first correspondence relationship is determined according to the numerology identifier(s) carried in the uplink grant(s) configured by the network-side device.

The first correspondence relationship is determined according to physical resource(s) corresponding to the uplink grant(s) configured by the network-side device, or the physical resource(s) corresponding to the uplink data transmission resource(s) corresponding to the uplink grant(s), and a third correspondence relationship between the numerologies and the physical resource(s) of uplink grant(s) or uplink data transmission(s).

The first correspondence relationship is determined according to the network slice identifier(s) corresponding to the uplink grant(s) configured by the network-side device, or the network slice identifier(s) corresponding to the uplink data transmission resource(s) corresponding to the uplink grant(s), and a fourth correspondence relationship between the numerology(numerologies) and the network slice identifier(s).

The first correspondence relationship is determined according to the network slice identifier(s) carried in the uplink grant(s) configured by the network-side device, and a fourth correspondence relationship between the numerology(numerologies) and the network slice identifier(s).

Optionally the processor 401 is configured to determine the second correspondence relationship configured by the network-side device in a part or all of the following implementations.

The second correspondence relationship between the bearer(s) and the numerology(numerologies), configured by a network-side device is determined when the bearer(s) is(are) set up.

The second correspondence relationship between the bearer(s) and the numerology (numerologies), configured by the network-side device via uplink grant(s) is determined.

The second correspondence relationship is determined according to a fifth correspondence relationship between the QoS parameter(s) and the numerology(numerologies), carried in the uplink grant configured by the network-side device, and a sixth correspondence relationship between the bearer(s) and the QoS parameter(s), configured when a bearer(s) of the user equipment are set up.

The second correspondence relationship is determined according to a fifth correspondence relationship between the QoS parameter(s) and the numerology(numerologies), notified by the network-side device via a broadcast or dedicated signaling, and a sixth correspondence relationship between the bearer(s) and the QoS parameter(s), configured when a bearer(s) of the user equipment is(are) set up.

The second correspondence relationship is determined according to the network slice identifier(s) carried when the bearer(s) is(are) set up, and a fourth correspondence relationship between the numerology and the network slice identifier(s).

The second correspondence relationship is determined according to a seventh correspondence relationship between the QoS parameter and the network slice identifier, notified by the network-side device via a broadcast or dedicated signaling, the QoS parameter of the bearer configured of the user equipment when the bearer is set up, and a fourth correspondence relationship between the numerology and the network slice identifier, notified by the network-side device via a broadcast or dedicated signaling.

Optionally the processor 401 is configured: to allocate a resource, and to compose an uplink data packet, according to the determined uplink grant corresponding to the numerology, and bearers corresponding to the numerology.

Optionally the processor 401 is configured: to determine an allocation order according to the priorities of the bearers corresponding to the numerology; to allocate a resource for each bearer from unallocated resources corresponding to the uplink grant according to a PBR of each bearer in the allocation order; to determine whether an allocation condition is satisfied, after the resource is allocated for each bearer; and if not, to allocate a resource for each bearer from the unallocated resources corresponding to the uplink grant according to the PBR of each bearer in the allocation order until the allocation condition is satisfied.

Where the allocation condition is that resources are allocated for data of all the bearers, or the resources are exhausted.

Optionally the processor 401 is configured: to determine an eighth correspondence relationship between the numerologies and physical layer parameters according to a prescription in a protocol, or a configuration of the network-side device via a broadcast or dedicated signaling; to determine a physical layer parameter according to the eighth correspondence relationship; and to perform an uplink data operation according to the determined physical layer parameter, uplink grant corresponding to the numerology, and bearers corresponding to the numerology.

In FIG. 4, the bus architecture (represented as the bus 400) can include any number of interconnecting buses and bridges to particularly link together various circuits including one or more processors represented by the processor 401, and one or more memories represented by the memory 404. The bus 400 can further link together various other circuits, e.g., a peripheral device, a manostat, a power management circuit, etc., all of which are well known in the art, so a further description thereof will be omitted in this context. The bus interface 403 serves as an interface between the bus 400 and the transceiver 402. The transceiver 402 can be an element, or can be a number of elements, e.g., a number of transmitters and receivers, which are units for communication with various other devices over a transmission medium. For example, the transceiver 402 receives external data from another device. The transceiver 402 is configured to transmit the data processed by the processor 401 to the other device. Dependent upon the nature of a computing system, the user interface 405, e.g., a keypad, a monitor, a speaker, a microphone, a joystick, etc., can be further provided.

The processor 401 is responsible for managing the bus 400 and performing normal processes, e.g., running a general operating system, etc., and the memory 404 can be configured to store data for use by the processor 401 in performing the operations.

Optionally the processor 401 can be a Central Processing Unit (CPU), an Application-Specific Integrated Circuit (ASIC), a Field-Programmable Gate Array (FPGA), or a Complex Programmable Logic Device (CPLD).

Figure 5:
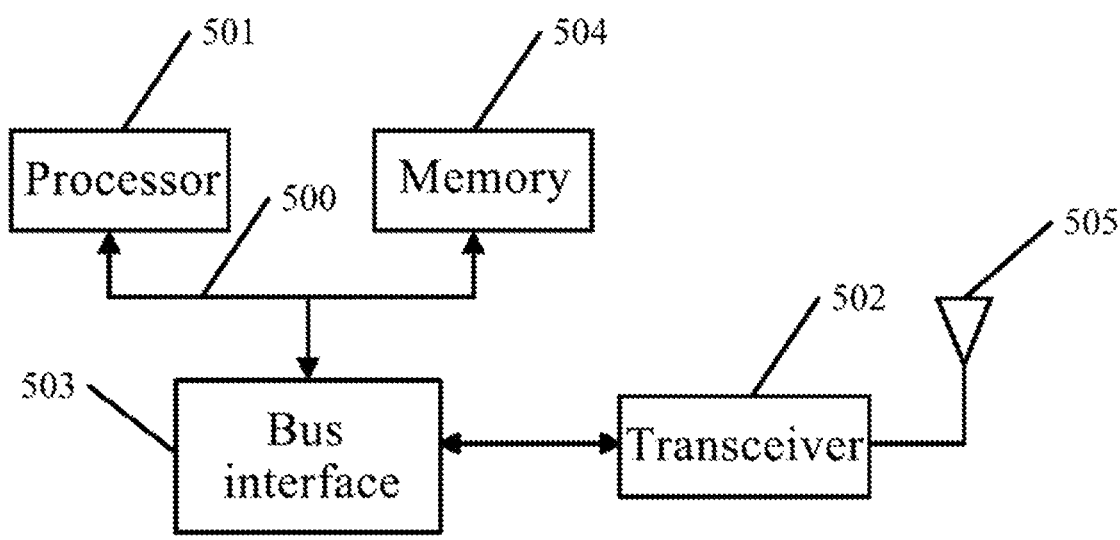
FIG. 5 is a schematic structural diagram of a second network-side device according to an embodiment of the invention.

As illustrated in FIG. 5, a second network-side device according to an embodiment of the invention includes the followings.

A processor 501 is configured to read and execute program in a memory 504: to determine first configuration information and second configuration information, where the first configuration information is used to determine a first correspondence relationship between numerologies and uplink grants, and the second configuration information is used to determine a second correspondence relationship between numerologies and bearers; and to transmit the configuration information to a user equipment through a transceiver 502 so that the user equipment determines uplink grant according to the first correspondence relationship, determines one or more bearers according to the second correspondence relationship, and performs an uplink data operation according to the uplink grant and the bearers.

The transceiver 502 is configured to receive and transmit data under the control of the processor 501.

Optionally the first configuration information includes a part or all of the following information: numerology identifiers; physical resources corresponding to the uplink grants; physical resources corresponding to uplink data transmission resources corresponding to the uplink grants; network slice identifiers corresponding to the uplink grants; and network slice identifiers corresponding to uplink data transmission resources corresponding to the uplink grants.

Optionally the second configuration information includes a part or all of the following information: the second correspondence relationship; s fourth correspondence relationship between the numerologies and the network slice identifiers; a fifth correspondence relationship between the QoS parameters and the numerologies; a sixth correspondence relationship between the bearers and the QoS parameters; a seventh correspondence relationship between the QoS parameters and the network slice identifiers; and network slice identifiers.

Optionally the processor 501 is further configured: to configure the user equipment with a parameter of a numerology via a broadcast or dedicated signaling so that the user equipment transmits data over an allocated resource according to the parameter of the numerology.

Here in FIG. 5, the bus architecture (represented as the bus 500) can include any number of interconnecting buses and bridges to particularly link together various circuits including one or more processors represented by the processor 500, and one or more memories represented by the memory 520. The bus 500 can further link together various other circuits, e.g., a peripheral device, a manostat, a power management circuit, etc., all of which are well known in the art, so a further description thereof will be omitted in this context. The bus interface 503 serves as an interface between the bus 500 and the transceiver 502. The transceiver 502 can be an element, or can be a number of elements, e.g., a number of transmitters and receivers, which are units for communication with various other devices over a transmission medium. Data processed by the processor 501 are transmitted over a radio medium through the antenna 505, and furthermore the antenna 505 further receives and transports data to the processor 501.

The processor 501 is responsible for managing the bus 500 and performing normal processes, and can further provide various functions of timing, a peripheral interface, voltage regulation, power source management, and other control functions, and the memory 504 can be configured to store data for use by the processor 600 in performing the operations.

Optionally the processor 501 can be a CPU, an ASIC, an FPGA, or a CPLD.

Based upon the same inventive idea, an embodiment of the invention further provides a method for performing an uplink data operation, and since the method addresses the problem under a similar principle to the system for performing an uplink data operation according to the embodiment of the invention, reference can be made to the implementation of the system for an implementation of the method, and a repeated description thereof will be omitted here.

Figure 6:
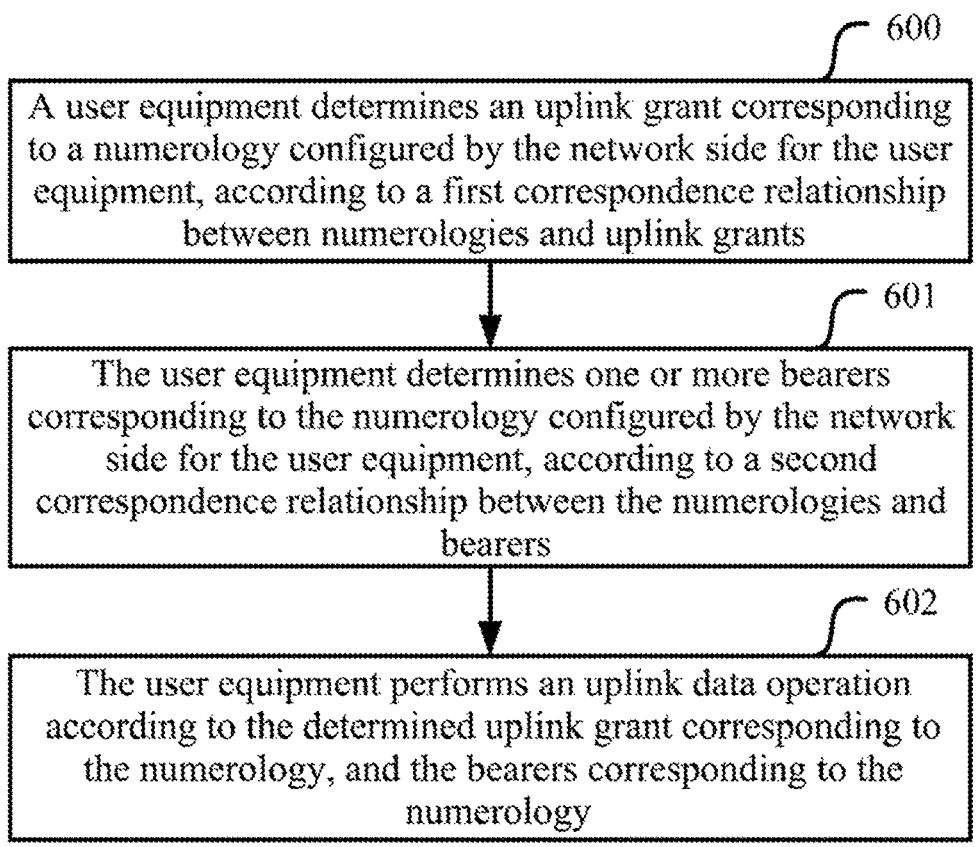
FIG. 6 is a schematic flow chart of a method for performing an uplink data operation according to an embodiment of the invention.

As illustrated in FIG. 6, a method for performing an uplink data operation according to the embodiment of the invention includes the following steps.

In the step 600, a user equipment determines uplink grant corresponding to a numerology configured by the network side for the user equipment, according to a first correspondence relationship between numerologies and uplink grants.

In the step 601, the user equipment determines one or more bearers corresponding to the numerology configured by the network side for the user equipment, according to a second correspondence relationship between the numerologies and the bearers.

In the step 602, the user equipment performs an uplink data operation according to the determined uplink grant corresponding to the numerology, and the one or more bearers corresponding to the numerology.

Optionally the bearer is a radio bearer or a logical channel.

Optionally the method further includes: the user equipment determines the first correspondence relationship and/or the second correspondence relationship according to a configuration of a network-side device.

Optionally the user equipment determines the first correspondence relationship configured by the network-side device in a part or all of the following implementations.

The user equipment determines the first correspondence relationship according to the numerology identifier(s) carried in the uplink grant(s) configured by the network-side device.

The user equipment determines the first correspondence relationship according to the physical resource(s) corresponding to the uplink grant(s) configured by the network-side device, or the physical resource(s) corresponding to an uplink data transmission resource(s) corresponding to the uplink grant(s), and a third correspondence relationship between the numerology(numerologies) and physical resource(s) of uplink grant(s) or uplink data transmission resource(s).

The user equipment determines the first correspondence relationship according to network slice identifier(s) corresponding to the uplink grant(s) configured by the network-side device, or the network slice identifier(s) corresponding to the uplink data transmission resource(s) corresponding to the uplink grant(s), and a fourth correspondence relationship between the numerology(numerologies) and network slice identifier(s).

The user equipment determines the first correspondence relationship according to network slice identifier(s) carried in the uplink grant(s) configured by the network-side device, and a fourth correspondence relationship between the numerology(numerologies) and the network slice identifier(s).

Optionally the user equipment determines the second correspondence relationship configured by the network-side device in a part or all of the following implementations.

The user equipment determines the second correspondence relationship between the bearer(s) and the numerology(numerologies), configured by a network-side device, when the bearer(s) are set up.

The user equipment determines the second correspondence relationship between the bearer(s) and the numerology(numerologies), configured by the network-side device via uplink grant.

The user equipment determines the second correspondence relationship according to a fifth correspondence relationship between the QoS parameter(s) and the numerology (numerologies), carried in the uplink grant configured by the network-side device, and a sixth correspondence relationship between the bearer(s) and the QoS parameter(s), configured when the bearer(s) of the user equipment is(are) set up.

The user equipment determines the second correspondence relationship according to a fifth correspondence relationship between the QoS parameter(s) and the numerology (numerologies), notified by the network-side device via a broadcast or dedicated signaling, and a sixth correspondence relationship between the bearers and the QoS parameters, configured when the bearer(s) of the user equipment is(are) set up.

The user equipment determines the second correspondence relationship according to the network slice identifier(s) carried when the bearer(s) is(are) set up, and a fourth correspondence relationship between the numerology (numerologies) and the network slice identifier(s).

The user equipment determines the second correspondence relationship according to a seventh correspondence relationship between the QoS parameter(s) and the network slice identifier(s), notified by the network-side device via a broadcast or dedicated signaling, the QoS parameter(s) of the bearer(s) configured of the user equipment when the bearer(s) is(are) set up, and a fourth correspondence relationship between the numerology(numerologies) and the network slice identifier(s), notified by the network-side device via a broadcast or dedicated signaling.

Optionally the user equipment performs an uplink data operation according to the determined uplink grant corresponding to the numerology, and bearers corresponding to the numerology as follows.

The user equipment allocates a resource, and composes an uplink data packet, according to the determined uplink grant corresponding to the numerology, and bearers corresponding to the numerology.

Optionally the user equipment allocates a resource according to the determined uplink grant corresponding to the numerology, and bearer corresponding to the numerology as follows.

The user equipment determines an allocation order according to the priorities of the bearers corresponding to the numerology.

The user equipment allocates a resource for each bearer from unallocated resources corresponding to the uplink grant according to a PBR of each bearer in the allocation order.

The user equipment determines whether an allocation condition is satisfied, after the resource is allocated for each bearer.

If not, then the user equipment may allocate a resource for each bearer from the unallocated resources corresponding to the uplink grant according to the PBR of each bearer in the allocation order until the allocation condition is satisfied.

Where the allocation condition is that resources are allocated for data of all the bearers, or the resources are exhausted.

Optionally before the user equipment performs an uplink data operation according to the determined uplink grant corresponding to the numerology, and bearer corresponding to the numerology, the method further includes: the user equipment determines an eighth correspondence relationship between the numerologies and physical layer parameters according to a prescription in a protocol, or a configuration of the network-side device via a broadcast or dedicated signaling.

The user equipment performs an uplink data operation according to the determined uplink grant corresponding to the numerology, and bearers corresponding to the numerology as follows.

The user equipment determines a physical layer parameter according to the eighth correspondence relationship.

The user equipment performs an uplink data operation according to the determined physical layer parameter, uplink grant corresponding to the numerology, and bearers corresponding to the numerology.

Figure 7:
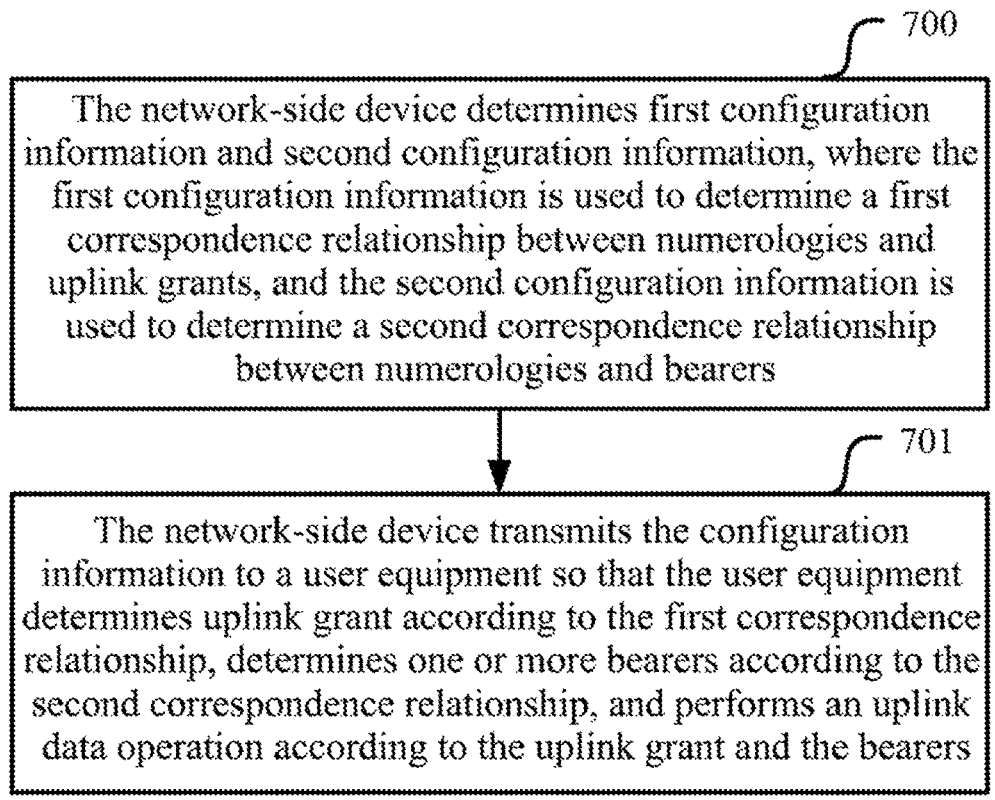
FIG. 7 is a schematic flow chart of a method for a network-side device to assist a user equipment in performing an uplink data operation according to an embodiment of the invention.

As illustrated in FIG. 7, a method for a network-side device to assist a user equipment in performing an uplink data operation according to an embodiment of the invention includes the following steps.

In the step 700, the network-side device determines first configuration information and second configuration information, where the first configuration information is used to determine a first correspondence relationship between the numerologies and uplink grants, and the second configuration information is used to determine a second correspondence relationship between the numerologies and bearers.

In the step 701, the network-side device transmits the configuration information to a user equipment so that the user equipment determines uplink grant according to the first correspondence relationship, determines one or more bearers according to the second correspondence relationship, and performs an uplink data operation according to the uplink grant and the bearer.

Optionally the first configuration information includes a part or all of the following information: numerology identifiers; physical resources corresponding to the uplink grants; physical resources corresponding to uplink data transmission resources corresponding to the uplink grants; network slice identifiers corresponding to the uplink grants; and network slice identifiers corresponding to uplink data transmission resources corresponding to the uplink grants.

Optionally the second configuration information includes a part or all of the following information: the second correspondence relationship; a fourth correspondence relationship between the numerologies and network slice identifiers; a fifth correspondence relationship between QoS parameters and the numerologies; a sixth correspondence relationship between bearers and the QoS parameters; a seventh correspondence relationship between the QoS parameters and the network slice identifiers; and network slice identifiers.

Optionally the method further includes: configuring the user equipment with parameters of a numerology via a broadcast or dedicated signaling so that the user equipment transmits data over an allocated resource according to the parameters of the numerology.

The solution according to the invention will be described below in details in connection with several examples thereof.

First Embodiment

In the step 1, a user equipment determines a correspondence relationship between a numerology and a physical layer configuration.

In order to enable the user equipment to transmit data using a correct numerology, the user equipment may be provided in advance with a configuration of respective physical layer parameters corresponding to the numerology.

In an implementation, the physical layer parameters corresponding to the numerology can be prescribed in a protocol, or can be notified to the user equipment by a network-side device via a broadcast or dedicated signaling.

In the step 2, the user equipment receives uplink grant of a network-side device.

Here the uplink grant (e.g., a PDCCH) carries a numerology identifier, and the user equipment determines a correspondence relationship between a numerology and a UL grant according to the numerology identifier carried in the uplink grant.

In the step 3, the user equipment determines a correspondence relationship between a numerology and a bearer.

In an implementation, the user equipment can obtain the correspondence relationship between a numerology and a bearer in one of the following alternatives without any limitation thereto.

Alt1: The correspondence relationship between a numerology and a bearer is preconfigured when a bearer is set up.

Alt2: The correspondence relationship between a numerology and a bearer is carried in uplink grant (e.g., a PDCCH).

Alt3: A correspondence relationship between a QoS and a numerology is carried in uplink grant (e.g., a PDCCH), and the user equipment determines the correspondence relationship between a numerology and a bearer according to a QoS parameter configuration of a bearer.

Alt4: The network-side device configures the user equipment with a correspondence relationship between a QoS and a numerology via a broadcast or dedicated signaling.

The user equipment determines the correspondence relationship between a numerology and a bearer according to a QoS parameter of a bearer, and the correspondence relationship between a QoS and a numerology.

Alt5: The network-side device configures a corresponding network slice identifier when a bearer is set up with the user equipment.

The user equipment determines the correspondence relationship between a numerology and a bearer according to a correspondence relationship between a network slice identifier and a numerology.

Alt6: The user equipment determines the network slice identifier according to a QoS parameter configured when the bearer is set up, and further determines the correspondence relationship between a numerology and a bearer according to a correspondence relationship between a network slice identifier and a numerology (preconfigured, or broadcasted by the network-side device, or configured by the network-side device via dedicated signaling).

In the step 4, the user equipment composes a Protocol Data Unit (PDU) based upon the numerology.

For example, there is a four-layer user-plane protocol stack, that is, the PDU is composed and delivered by the MAC layer to the underlying layer, where the PDU is referred here to as an MAC PDU (if the protocol stack is optimized later, then the PDU may also be referred otherwise to; and the PDU here refers to a higher-layer PDU immediately adjacent to the physical layer).

For a UL grant corresponding to the numerology, a PDU packet is composed as follows.

In the step 1, the user equipment sorts correspondence relationships of all the bearers corresponding to the numerology in an order of the priorities of the bearers, and allocates a resource in a first round according to a PBR corresponding to each bearer.

In the step 2, if there are remaining resources after the user equipment allocates the resources in the first round, then the user equipment can allocate resources in a second round according to the priorities determined in the step 1.

The user equipment allocates the resources in the second round by allocating resources for all the remaining data of the respective carriers until the resources have been allocated for the remaining data of the respective carriers, or all the resources of the UL grant corresponding to the numerology are exhausted.

Second Embodiment

In the step 1, a user equipment determines a correspondence relationship between a numerology and a physical layer configuration.

In order to enable the user equipment to transmit data using a correct numerology, the user equipment may be provided in advance with a configuration of respective physical layer parameters corresponding to the numerology.

In an implementation, the physical layer parameters corresponding to the numerology can be prescribed in a protocol, or can be notified to the user equipment by a network-side device via a broadcast or dedicated signaling.

In the step 2, the user equipment receives uplink grant of a network-side device.

Here the numerology is bound with a physical resource corresponding to the uplink grant, or a physical resource corresponding to an uplink data transmission resource corresponding to the uplink grant, and the user equipment determines a correspondence relationship between a numerology and uplink grant according to the physical resource corresponding to the uplink grant configured by the network-side device, or the physical resource corresponding to the uplink data transmission resource corresponding to the uplink grant.

In the step 3, the user equipment determines a correspondence relationship between a numerology and a bearer.

In an implementation, the user equipment can obtain the correspondence relationship between a numerology and a bearer in one of the following alternatives without any limitation thereto.

Alt1: The correspondence relationship between a numerology and a bearer is preconfigured when a bearer is set up.

Alt2: The correspondence relationship between a numerology and a bearer is carried in uplink grant (e.g., a PDCCH).

Alt3: A correspondence relationship between a QoS and a numerology is carried in uplink grant (e.g., a PDCCH), and the user equipment determines the correspondence relationship between a numerology and a bearer according to a QoS parameter configuration of a bearer.

Alt4: The network-side device configures the user equipment with a correspondence relationship between a QoS and a numerology via a broadcast or dedicated signaling.

The user equipment determines the correspondence relationship between a numerology and a bearer according to a QoS parameter of a bearer, and the correspondence relationship between a QoS and a numerology.

Alt5: The network-side device configures a corresponding network slice identifier when a bearer is set up with the user equipment.

The user equipment determines the correspondence relationship between a numerology and a bearer according to a correspondence relationship between a network slice identifier and a numerology.

Alt6: The user equipment determines the network slice identifier according to a QoS parameter configured when the bearer is set up, and further determines the correspondence relationship between a numerology and a bearer according to a correspondence relationship between a network slice identifier and a numerology (preconfigured, or broadcasted by the network-side device, or configured by the network-side device via dedicated signaling).

In the step 4, the user equipment composes a PDU based upon the numerology.

For example, there is a four-layer user-plane protocol stack, that is, the PDU is composed and delivered by the MAC layer to the underlying layer, where the PDU is referred here to as an MAC PDU (if the protocol stack is optimized later, then the PDU may also be referred otherwise to; and the PDU here refers to a higher-layer PDU immediately adjacent to the physical layer).

For a UL grant corresponding to the numerology, a PDU packet is composed as follows.

In the step 1, the user equipment sorts correspondence relationships of all the bearers corresponding to the numerology in an order of the priorities of the bearers, and allocates a resource in a first round according to a PBR corresponding to each bearer.

In the step 2, if there are remaining resources after the user equipment allocates the resources in the first round, then the user equipment can allocate resources in a second round according to the priorities determined in the step 1.

The user equipment allocates the resources in the second round by allocating resources for all the remaining data of the respective carriers until the resources have been allocated for the remaining data of the respective carriers, or all the resources of the UL grant corresponding to the numerology are exhausted.

Third Embodiment

In the step 1, a user equipment determines a correspondence relationship between a numerology and a physical layer configuration.

In order to enable the user equipment to transmit data using a correct numerology, the user equipment will be provided in advance with a configuration of respective physical layer parameters corresponding to the numerology.

In an implementation, the physical layer parameters corresponding to the numerology can be prescribed in a protocol, or can be notified to the user equipment by a network-side device via a broadcast or dedicated signaling.

In the step 2, the user equipment receives uplink grant of a network-side device.

The user equipment determines a correspondence relationship between a numerology and uplink grant according to a network slice identifier corresponding to the uplink grant configured by a network-side device, or a network slice identifier corresponding to an uplink data transmission resource corresponding to the uplink grant, and a correspondence relationship between a numerology and a network slice identifier.

In the step 3, the user equipment determines a correspondence relationship between a numerology and a bearer.

In an implementation, the user equipment can obtain the correspondence relationship between a numerology and a bearer in one of the following alternatives without any limitation thereto.

Alt1: The correspondence relationship between a numerology and a bearer is preconfigured when a bearer is set up.

Alt2: The correspondence relationship between a numerology and a bearer is carried in uplink grant (e.g., a PDCCH).

Alt3: A correspondence relationship between a QoS and a numerology is carried in uplink grant (e.g., a PDCCH), and the user equipment determines the correspondence relationship between a numerology and a bearer according to a QoS parameter configuration of a bearer.

Alt4: The network-side device configures the user equipment with a correspondence relationship between a QoS and a numerology via a broadcast or dedicated signaling.

The user equipment determines the correspondence relationship between a numerology and a bearer according to a QoS parameter of a bearer, and the correspondence relationship between a QoS and a numerology.

Alt5: The network-side device configures a corresponding network slice identifier when a bearer is set up with the user equipment.

The user equipment determines the correspondence relationship between a numerology and a bearer according to a correspondence relationship between a network slice identifier and a numerology.

Alt6: The user equipment determines the network slice identifier according to a QoS parameter configured when the bearer is set up, and further determines the correspondence relationship between a numerology and a bearer according to a correspondence relationship between a network slice identifier and a numerology (preconfigured, or broadcasted by the network-side device, or configured by the network-side device via dedicated signaling).

In the step 4, the user equipment composes a PDU based upon the numerology.

For example, there is a four-layer user-plane protocol stack, that is, the PDU is composed and delivered by the MAC layer to the underlying layer, where the PDU is referred here to as an MAC PDU (if the protocol stack is optimized later, then the PDU may also be referred otherwise to; and the PDU here refers to a higher-layer PDU immediately adjacent to the physical layer).

For a UL grant corresponding to the numerology, a PDU packet is composed as follows.

In the step 1, the user equipment sorts correspondence relationships of all the bearers corresponding to the numerology in an order of the priorities of the bearers, and allocates a resource in a first round according to a PBR corresponding to each bearer.

In the step 2, if there are remaining resources after the user equipment allocates the resources in the first round, then the user equipment will allocate resources in a second round according to the priorities determined in the step 1.

The user equipment allocates the resources in the second round by allocating resources for all the remaining data of the respective carriers until the resources are allocated for the remaining data of the respective carriers, or all the resources of the UL grant corresponding to the numerology are exhausted.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

Correspondingly the invention can be further embodied in hardware and/or software (including firmware, resident software, micro-codes, etc.). Still furthermore the invention can be embodied in the form of a computer program product on a computer useable or readable storage medium, where the computer program product includes computer useable or readable program codes embodied in the medium to be used by or in connection with an instruction executing system. In the context of the invention, the computer useable or readable medium can be any medium which can include, store, communicate, transmit, or transport program to be used by or in connection with an instruction executing system, apparatus or device.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for performing an uplink data operation, the method comprising:
    determining, by a user equipment, an uplink grant corresponding to a numerology configured by the network side for the user equipment, according to a first correspondence relationship between numerologies and uplink grants;
    determining, by the user equipment, one or more bearers corresponding to the numerology configured by the network side for the user equipment, according to a second correspondence relationship between the numerologies and bearers; and
    performing, by the user equipment, an uplink data operation according to the determined uplink grant corresponding to the numerology and the determined bearers corresponding to the numerology;
    wherein the method further comprises:
    determining, by the user equipment, the first correspondence relationship and/or the second correspondence relationship according to a configuration of a network-side device.

2. The method according to claim 1, wherein the bearer is a radio bearer or a logical channel.

3. The method according to claim 1, wherein the user equipment determines the first correspondence relationship configured by the network-side device in a part or all of the following implementations:
    the user equipment determines the first correspondence relationship according to numerology identifiers carried in the uplink grants configured by the network-side device;
    the user equipment determines the first correspondence relationship according to physical resources corresponding to the uplink grants configured by the network-side device, or physical resources corresponding to uplink data transmission resources corresponding to the uplink grants, and a third correspondence relationship between the numerologies and the physical resources of uplink grants or the uplink data transmission resources;
    the user equipment determines the first correspondence relationship according to network slice identifiers corresponding to the uplink grants configured by the network-side device, or network slice identifiers corresponding to the uplink data transmission resources corresponding to the uplink grants, and a fourth correspondence relationship between numerologies and the network slice identifiers; and
    the user equipment determines the first correspondence relationship according to network slice identifiers carried in the uplink grants configured by the network-side device, and the fourth correspondence relationship between numerologies and the network slice identifiers.

4. The method according to claim 1, wherein the user equipment determines the second correspondence relationship configured by the network-side device in a part or all of the following implementations:

the user equipment determines the second correspondence relationship between bearers and numerologies, configured by the network-side device, when the bearers are set up;

the user equipment determines the second correspondence relationship between bearers and numerologies, configured by the network-side device via the uplink grants;

the user equipment determines the second correspondence relationship according to a fifth correspondence relationship between QoS parameters and the numerologies, carried in the uplink grants configured by the network-side device, and a sixth correspondence relationship between the bearers and the QoS parameters, configured when the bearers of the user equipment are set up;

the user equipment determines the second correspondence relationship according to the fifth correspondence relationship between the QoS parameters and the numerologies, notified by the network-side device via a broadcast or dedicated signaling, and a sixth correspondence relationship between the bearers and the QoS parameters, configured when the bearers of the user equipment are set up;

the user equipment determines the second correspondence relationship according to network slice identifiers carried when the bearers are set up, and a fourth correspondence relationship between the numerologies and the network slice identifiers; and the user equipment determines the second correspondence relationship according to a seventh correspondence relationship between the QoS parameters and the network slice identifiers, notified by the network-side device via a broadcast or dedicated signaling, the QoS parameters of the bearers configured of the user equipment when the bearers are set up, and the fourth correspondence relationship between the numerologies and the network slice identifiers, notified by the network-side device via a broadcast or dedicated signaling.

5. The method according to claim 1, wherein performing, by the user equipment, the uplink data operation according to the determined uplink grant corresponding to the numerology, and the determined bearers corresponding to the numerology comprises:

allocating, by the user equipment, a resource, and composing an uplink data packet, according to the determined uplink grant corresponding to the numerology, and the determined bearers corresponding to the numerology.

6. The method according to claim 5, wherein allocating, by the user equipment, the resource according to the determined uplink grant corresponding to the numerology, and the determined bearers corresponding to the numerology comprises:

determining, by the user equipment, an allocation order according to priorities of the bearers corresponding to the numerology;

allocating, by the user equipment, a resource for each of the bearers from unallocated resources corresponding to the uplink grant according to a PBR of each bearer in the allocation order;

the user equipment determines whether an allocation condition is satisfied, after the resource is allocated for each bearer; and if the allocation condition is not satisfied, then allocating, by the user equipment, a resource for each bearer from the unallocated resources corresponding to the uplink grant according to the PBR of each bearer in the allocation orders until the allocation condition is satisfied;

wherein the allocation condition is that resources are allocated for data of all the bearers, or the resources are exhausted.

7. The method according to claim 1, wherein before the user equipment performs the uplink data operation according to the determined uplink grant corresponding to the numerology, and the determined bearer corresponding to the numerology, the method further comprises:

determining, by the user equipment, an eighth correspondence relationship between numerologies and physical layer parameters according to a prescription in a protocol, or a configuration of the network-side device via a broadcast or a dedicated signaling; and performing, by the user equipment, the uplink data operation according to the determined uplink grant corresponding to the numerology, and the determined bearers corresponding to the numerology comprises:

determining, by the user equipment, a physical layer parameter according to the eighth correspondence relationship; and performing, by the user equipment, the uplink data operation according to the determined physical layer parameter, the uplink grant corresponding to the numerology, and the bearers corresponding to the numerology.

8. A method for allocating a resource, the method comprising:

determining, by a network-side device, first configuration information and second configuration information, wherein the first configuration information is used to determine a first correspondence relationship between numerologies and uplink grants, and the second configuration information is used to determine a second correspondence relationship between numerologies and bearers; and transmitting, by the network-side device, the configuration information to a user equipment so that the user equipment determines an uplink grant according to the first correspondence relationship, determines one or more bearers according to the second correspondence relationship, and performs an uplink data operation according to the uplink grant and the bearers.

9. The method according to claim 8, wherein the first configuration information comprises a part or all of the following information:

numerology identifiers;

physical resources corresponding to the uplink grants;

physical resources corresponding to uplink data transmission resources corresponding to the uplink grants;

network slice identifiers corresponding to the uplink grants; and network slice identifiers corresponding to the uplink data transmission resources corresponding to the uplink grants.

10. The method according to claim 8, wherein the second configuration information comprises a part or all of the following information:

the second correspondence relationship;

a fourth correspondence relationship between numerologies and network slice identifiers;

a fifth correspondence relationship between QoS parameters and numerologies;

a sixth correspondence relationship between the bearers and the QoS parameters;

a seventh correspondence relationship between the QoS parameters and the network slice identifiers; and the network slice identifiers.

11. The method according to claim 8, wherein the method further comprises:

configuring, by the network-side device, the user equipment with a parameter of a numerology via a broadcast or dedicated signaling so that the user equipment transmits data over an allocated resource according to the parameter of the numerology.

12. A user equipment for performing an uplink data operation, comprising:

a processor configured to read and execute program in a memory:

to determine an uplink grant corresponding to a numerology configured by the network side for the user equipment, according to a first correspondence relationship between numerologies and uplink grants;

to determine one or more bearers corresponding to the numerology configured by the network side for the user equipment, according to a second correspondence relationship between the numerologies and bearers; and to perform an uplink data operation according to the determined uplink grant corresponding to the numerology, and the determined bearers corresponding to the numerology; and a transceiver configured to receive and transmit data under the control of the processor;

wherein the processor is further configured to determine the first correspondence relationship and/or the second correspondence relationship according to a configuration of a network-side device.

13. The user equipment according to claim 12, wherein the bearer is a radio bearer or a logical channel.

14. The user equipment according to claim 12, wherein the processor is configured to determine the first correspondence relationship configured by the network-side device in a part or all of the following implementations:

the first correspondence relationship is determined according to numerology identifiers carried in the uplink grants configured by the network-side device;

the first correspondence relationship is determined according to physical resources corresponding to the uplink grants configured by the network-side device, or physical resources corresponding to uplink data transmission resources corresponding to the uplink grants, and a third correspondence relationship between the numerologies and the physical resources of the uplink grants or the uplink data transmission resources;

the first correspondence relationship is determined according to network slice identifiers corresponding to the uplink grants configured by the network-side device, or network slice identifiers corresponding to the uplink data transmission resources corresponding to the uplink grants, and a fourth correspondence relationship between the numerologies and the network slice identifiers; and the first correspondence relationship is determined according to the network slice identifiers carried in the uplink grants configured by the network-side device, and a fourth correspondence relationship between the numerologies and the network slice identifiers.

15. The user equipment according to claim 12, wherein the processor is configured to determine the second correspondence relationship configured by the network-side device in a part or all of the following implementations:

the second correspondence relationship between the bearers and the numerologies, configured by the network-side device is determined when the bearers are set up;

the second correspondence relationship between the bearers and the numerologies, configured by the network-side device via the uplink grants is determined;

the second correspondence relationship is determined according to a fifth correspondence relationship between QoS parameters and the numerologies, carried in the uplink grants configured by the network-side device, and a sixth correspondence relationship between the bearers and the QoS parameters, configured when the bearers of the user equipment are set up;

the second correspondence relationship is determined according to a fifth correspondence relationship between the QoS parameters and the numerologies, notified by the network-side device via a broadcast or dedicated signaling, and a sixth correspondence relationship between the bearers and the QoS parameters, configured when the bearers of the user equipment are set up;

the second correspondence relationship is determined according to network slice identifiers carried when the bearers are set up, and a fourth correspondence relationship between numerologies and the network slice identifiers; and the second correspondence relationship is determined according to a seventh correspondence relationship between the QoS parameters and the network slice identifiers, notified by the network-side device via a broadcast or dedicated signaling, the QoS parameters of the bearers configured of the user equipment when the bearers are set up, and a fourth correspondence relationship between the numerologies and the network slice identifiers, notified by the network-side device via a broadcast or dedicated signaling.

16. The user equipment according to claim 12, wherein the processor is configured:

to allocate a resource, and to compose an uplink data packet, according to the determined uplink grant corresponding to the numerology, and the determined bearers corresponding to the numerology.

17. The user equipment according to claim 16, wherein the processor is configured:

to determine an allocation order according to priorities of the bearers corresponding to the numerology;

to allocate a resource for each bearer from unallocated resources corresponding to the uplink grant according to a PBR of each bearer in the allocation order;

to determine whether an allocation condition is satisfied, after the resource is allocated for each bearer; and if the allocation condition is not satisfied, to allocate a resource for each bearer from the unallocated resources corresponding to the uplink grant according to the PBR of each bearer in the allocation orders until the allocation condition is satisfied;

wherein the allocation condition is that resources are allocated for data of all the bearers, or the resources are exhausted.

18. The user equipment according to claim 12, wherein the processor is configured:

to determine an eighth correspondence relationship between the numerologies and physical layer parameters according to a prescription in a protocol, or a configuration of the network-side device via a broadcast or a dedicated signaling;

to determine a physical layer parameter according to the eighth correspondence relationship; and to perform the uplink data operation according to the determined physical layer parameter, the uplink grant corresponding to the numerology, and the bearer corresponding to the numerology.

\* \* \* \* \*